CYCLICALLY OPERATING DISTRIBUTER COMPUTER WITH A SINGLE LOGICALLY COMPLETE CALCULATING UNIT

Filed July 8, 1959 2 Sheets-Sheet 1

INVENTOR:
Joseph O. Campeau

By Marvin H. Kleinberg
Attorney.

INVENTOR:
Joseph O. Campeau
By Marvin H. Kleinberg
Attorney.

United States Patent Office 3,113,205

Patented Dec. 3, 1963

3,113,205

CYCLICALLY OPERATING DISTRIBUTER COMPUTER WITH A SINGLE LOGICALLY COMPLETE CALCULATING UNIT

Joseph O. Campeau, Granada Hills, Calif., assignor, by mesne assignments, to Litton Systems, Inc., Beverly Hills, Calif., a corporation of Maryland Filed July 8, 1959, Ser. No. 825,703
16 Claims. (Cl. 235—159)

This invention relates to computing devices and, more particularly, to an extremely simple digital computer capable of bit-by-bit computations on information stored in repeatedly accessible memory cells, having increased reliability and greatly reduced size and complexity, and permitting complex computations with only a single logical operator.

In the field of electronic computers, for many years the design philosophy has been oriented toward large, costly, complex devices in which, at each operation interval, several complex logical functions are produced through correspondingly complex interconnected logical elements. These computers are designed to operate at extremely high speeds and simultaneously process many signals representing numbers, instructions and addresses. However, as a result of their speed and complexity, they also tend to be subject to frequent failures and are otherwise unreliable.

In recent years, however, a divergent trend has arisen in the computer field toward smaller devices that perform only a few, fundamental, logical operations, but which repeatedly perform these operations upon information signals to achieve equally complex logical functions of variables, though at a much slower rate. Examples of such computing devices are to be found in the copending applications of Floyd G. Steele, Serial No. 648,321, entitled Simplified Methods and Apparatus for Digital Computation, filed March 25, 1957 and of Joseph O. Campeau, Serial No. 750,940, entitled Simple General Purpose Computer, filed July 25, 1958. These smaller and simpler computers more than make up for their slower speed by their lower cost, greater reliability of operation, and increased freedom from component failures. Moreover, the speeds of the larger machines of the prior art are often unnecessarily high for the uses contemplated and, in many cases, speeds may be substantially reduced without adverse results. In many applications, for example, such as process control or navigation, a computer of relatively slow speed is more than adequate to meet the computation problem.

The operation of every computer, no matter what its size, can be expressed as a complex logical equation or function of Boolean variables. As has been shown in the copending applications mentioned above, it is possible to develop every complex function of variables with simpler, cheaper, and slower machines. A few fundamental logical operations, if repeatedly performed in the proper order upon a given set of input signals, will provide a result that is no different from the result produced by a much more complex computer operating in response to the same input signals.

In the copending Campeau application, a computer was described having a cyclically operable serial program loop and two cyclically operable serial information storage loops, all of different, but related lengths. Each signal combination in the program loop selected signals representing information from among the contents of a static storage element and storage cells of each of the two circulating serial information loops, and specified one of seven logical operations to be performed upon the selected signals. By suitable ordering of the program signals, the computer could perform any logical operation or set of operations and an example was given of a mechanization resulting in a general purpose digital computer.

It will be recognized that these smaller computers represent a significant step forward in the art, but it may also be seen that the ultimate in simplicity has not yet been achieved. The computer of the present invention therefore represents a major advance in further simplifying a computer, not only in size, but also in structural complexity. A computer assembled in accordance with the basic concepts of the present invention combines the virtues of small size, simple construction, and efficient and economical use of components.

In the large scale, prior art computing devices, repeated access to a single, discrete storage element is gained only by the provision of large capacity, high speed, random access memories. High operating speeds are achieved but are paid for in terms of costly and complex addressing and buffering equipment.

At some sacrifice of speed, the smaller but more economical, simpler computers of Steele and Campeau, mentioned above, use a cyclical serial memory and gain repeated access to a discrete storage element by waiting for the recurrence of the element Here, repeated access is paid for by the provision of idling or "do nothing" instructions in the operating program. Not only is time lost to allow for this circulation of the memory until particular storage elements are available to provide or receive information, but program space is wasted as well.

The present invention combines the versatility of the random access type memory of the large scale machines with the simplicity and economy of the serial operating structure of the smaller machine to effect significant savings in both time and hardware. A plurality of discrete storage elements are connected, in a predetermined arrangement, to provide a sequential switching device with repeated access to every element. Each memory element can be connected to apply input signals representing information to a logic circuit many times during an operation cycle, and similarly, the switching device applies logic circuit output signals to the various memory elements in a prearranged sequential order. No time is lost waiting for access to particular cells, and the addressing equipment is inexpensive and reliable.

Another significant advance in the art made by the present invention is the capability of repetitively processing information signals with a single logical operating element. It has long been known that all logical operations can be derived from the so-called "primitive" logical operations such as the Sheffer or "stroke" function. For years, logicians have performed these derivations as an exercise of limited practical value. As will be described below, any complex logical formula can be built up from simple terms by repeated performance of the "primitive" logical operations. However, the ability to utilize only a single logical operation in a practical device makes superfluous the program channels of both the Steele and Campeau computers. By eliminating the electronic circuitry associated with the several logical operations as well as the circuits and transducers associated with the mechanization of the program channels themselves, these remarkably simple machines can be made even simpler and less costly. In a specific embodiment of the present invention, a computation can be performed by merely selecting the order in which the individual memory elements both provide input signals to a single logic element and store output signals from the logic element, which, as a result, specifies the manner of interconnecting the memory elements with the switching device.

The computer of the present invention has been termed a "distributer" computer because signals are collected from scattered sources, combined in the logical operator and "distributed" among other cells, using mechanisms similar to distributors or commutators.

In a preferred specific embodiment of the present invention, a plurality of capacitors is used as a memory, each capacitor being used to store a single bilevel signal representing a binary information bit. A three deck multi-contact distributor or commutator serves as a switching device. The contacts or segments of two of the decks serve as read points and the segments of the third deck serve as write points. A wiper, associated with each deck, contacts a segment on each of the respective decks in timed synchronism. Individual segments are connected to individual capacitors in the memory and many of the capacitors are connected to several segments. Unlike ordinary serial memory devices, all of the memory cells need not be contacted before a cell can be contacted for the second time, and, in fact, many cells are contacted several times during each operating sequence. Such an arrangement provides the desired "repeated access" to each cell of the memory.

A single logic circuit, having two input terminals and an output terminal, is connected to the switching device. Two of the three wipers are connected to apply input signals from the memory to the input terminals of the logic circuit, which generates an output signal representing the result of the "stroke" operation upon the applied input signal. The output signal is then applied through the wiper of the third deck to be stored in the cell of the memory connected to the segment then in contact with the wiper.

Because human operators are most familiar with the decimal number system, a 10-key keyboard has been chosen to provide the computer with information input signals. Each key of the keyboard provides a different group of signals representing a four bit binary number to the computer on four signal lines, permitting internal computation in the binary system. A display device is connected to certain selected cells of the memory to provide a visual indication of the binary number stored in the memory.

In addition to the specific embodiment mentioned above, other alternative embodiments can be constructed according to the basic principles of the present invention. For example, virtually any type of memory can be used so long as each discrete storage element is individually accessible. This would permit the use of magnetic cores, or, if the cost and complexity can be overlooked, with the provision of suitable addressing matrices any of the other well known random access memory systems such as, for example, apertured ferrite plates or cathode ray tubes could also be used.

Because of the inherent structural simplicity of the present invention, each of the other component elements of the computer may be chosen from a wide assortment of equivalent devices. A set of toggle switches may be used for the provision of input information and can easily be substituted for the keyboard to enter binary numbers into the system. Rearrangement of the wiring scheme can be facilitated through the use of plug boards or the like. Other switching mechanisms, such as two-deck, or even single deck distributors can easily be adapted to operate in the present invention by revising the wiring order and choosing an alternative mechanization of the logical operator. However, other types of switching devices, such as ring counters which have no moving parts or other, all-electronic, switches can also be used. Primitive functions, such as the Peirce, or others mentioned below, can replace the Sheffer or "stroke" in the logic circuit. Many circuits, well known in the art, are available to provide a response to applied input signals representing any selected logical operation.

MATHEMATICAL BACKGROUND

Before continuing with the description of the present invention, it may be helpful to the reader to review some of the properties of the so-called "primitive" logical operations and symbolic logic notation as well. In the present discussions, Boolean variables are represented by italicized capitals, the logical "and" or conjunction is represented by the adjacent placement of terms or by the symbol (·), the logical "or" or disjunction is represented by the symbol (+), the exclusive "or" or logical difference is represented by the symbol (⊕), and the negation of a term is represented by a bar or vinculum over the quantities affected.

The Sheffer or stroke function ($A/B$) is one of the groups of "primitive" logical operations and considered to be complete in itself. By "primitive" it is meant that it is possible to generate every Boolean function of variables using only the single, "primitive" logical operation. The Peirce, or arrow function ($A \downarrow B$) is also a "primitive" operation complete in itself, and may be used instead of the stroke. A primitive system using any Boolean functions other than the Sheffer or Peirce functions requires more than one logical function to be complete. For example, the "or" (+) and negation (—), taken together, are a primitive system, as are the "and" (·) and negation functions. Certain other functions, of the form ($A+\bar{B}$) called the half-Sheffer and of the form ($A \cdot \bar{B}$) called the half-Peirce are also primitive in conjunction with functions representing binary "0's" and "1's." In the preferred embodiment of the present invention, a single "primitive" function, the stroke, was chosen although the invention could easily be mechanized using others.

The stroke operation can be defined in terms of other primitive logical operations such as, for example, the logical equivalent "and" and "or" terms, as follows:

$$A/B \equiv \bar{A}+\bar{B} \equiv \overline{A \cdot B} \quad (1)$$

Given now the elements of Boolean algebra, the addition of two binary numbers can be represented by Boolean logical equations in which the sum and carry terms can be expressed as functions of the applied input terms. These equations may be easily derived from the following table, in which "A" is the augend term, "B" is the addend term and "C" is the carry term from the addition of lower order terms. The "exclusive or" is used in the following equations and is equivalent to the relationship:

$$A \oplus B = \bar{A} \cdot B + A \cdot \bar{B} \quad (2)$$

*Table 1*

| Inputs | | | Results | |
|---|---|---|---|---|
| Augend A | Addend B | Old Carry $C_{(old)}$ | Sum S | New Carry $C_{(new)}$ |
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

By inspection, the following equations can be written immediately:

$$S=1=A\bar{B}\bar{C}+\bar{A}B\bar{C}+\bar{A}\bar{B}C+ABC \quad (3)$$

$$C_{(new)}=1=AB\bar{C}+A\bar{B}C+\bar{A}BC+ABC \quad (4)$$

By rearranging and dropping redundant terms, Equations 1 and 2 can be reduced to the following:

$$S=A \oplus B \oplus C \quad (5)$$

$$C_{(new)}=AB+C(A+B) \quad (6)$$

The Equations 5 and 6 can be derived in a succession of steps from A, B, and C, using the stroke function as defined in Equation 1. In Table 2 below, the terms in columns 1 and 2 represent the functions that are combined in the stroke operation and column 3 contains the equivalent expression of each result term using other Boolean functions.

*Table 2*

| Col. 1 | | Col. 2 | Col. 3 | |
|---|---|---|---|---|
| $\underline{A}$ | / | $\underline{A}$ | $\underline{\overline{A}}$ | (7) |
| $\underline{B}$ | / | $\underline{B}$ | $\underline{\overline{B}}$ | (8) |
| $\underline{\overline{A}}$ | / | $\underline{\overline{B}}$ | $\underline{A+B}$ | (9) |
| $\underline{A}$ | / | $\underline{B}$ | $\underline{\overline{A}+\overline{B}}$ | (10) |
| $\underline{A+B}$ | / | $\underline{\overline{A}+\overline{B}}$ | $\underline{AB}+\underline{\overline{A}\,\overline{B}}=\underline{\overline{A\oplus B}}$ | (11) |
| $\underline{\overline{A\oplus B}}$ | / | $\underline{\overline{A\oplus B}}$ | $\underline{A\oplus B}$ | (12) |
| $\underline{C}$ | / | $\underline{\overline{A\oplus B}}$ | $\underline{\overline{C}+(A\oplus B)}$ | (13) |
| $\underline{C}$ | / | $\underline{C}$ | $\underline{\overline{C}}$ | (14) |
| $\underline{\overline{C}}$ | / | $\underline{A\oplus B}$ | $\underline{C+\overline{A\oplus B}}$ | (15) |
| $\underline{\overline{C}+(A\oplus B)}$ | / | $\underline{C+\overline{A\oplus B}}$ | $\underline{C\oplus A\oplus B}=\underline{\underline{Sum}}$ | (16) |
| $\underline{A+B}$ | / | $\underline{C}$ | $\underline{\overline{C}+\overline{A+B}}$ | (17) |
| $\underline{\overline{A}+\overline{B}}$ | / | $\underline{\overline{C}+\overline{A+B}}$ | $\underline{\overline{\overline{A}+\overline{B}}+\overline{\overline{C}+\overline{A+B}}=AB+C(A+B)}=\underline{\underline{Carry}}$ | (18) |

It may be noted that, except for the terms $\underline{A}$, $\underline{B}$, and $\underline{C}$, which are the starting terms, each subsequent input term is the output term resulting from an earlier stroke operation. Therefore, with the feature of repeated access to each memory cell, Equations 7 through 18 lend themselves to efficient mechanization in the preferred embodiment of the computer of the present invention.

The sum and carry Equations 3 and 4 could also be derived from the starting terms by repeated processing with Peirce or "arrow" function ($\underline{A}\downarrow\underline{B}$) which can be expressed:

$$\underline{A}\downarrow\underline{B}=\underline{\overline{A}}\cdot\underline{\overline{B}}=\underline{\overline{A+B}} \qquad (19)$$

A similar table for the sum and carry formulations using the Peirce "arrow" can be easily drawn up but such a table is not necessary to an understanding of the present invention.

Accordingly, it is an object of the invention to provide a general purpose digital computer utilizing a plurality of individually accessible memory elements, a cyclical switching device and a logical operator.

It is an object of the present invention to provide a simple, serially operable computer having a plurality of repeatedly accessible memory cells.

It is an object of the present invention to provide a serially operable computer capable of functioning with only a single logical operation.

It is another object of the present invention to increase the speed of computation by providing repeatedly accessible memory elements and to reduce the number of component parts by sharing a logic element among all of the memory elements for the serial processing of information.

It is a further object of the present invention to provide a general purpose digital computer which operates by repeatedly performing a primitive logical operation upon serially applied signals which represent the results of earlier operations.

It is a still further object of the invention to provide a general purpose digital computer serially operable upon applied signals representing functions of Boolean variables, to produce signals representing a more complex function of Boolean variables.

It is another object of the invention to provide a general purpose digital computer capable of generating a complex function of Boolean variables by repetitive application of signals to a single logical operator, and capable of generating an entirely different complex function of Boolean variables by changing the interconnections between the logical operator and the memory, thereby changing the order in which signals are repetitively applied.

It is a further object of the present invention to provide a small, reliable computer having few component parts for serially processing information bit-by-bit through a primitive logical network and in which the intermediate results are readily accessible for repeated processing to produce new and more complex information results.

It is another object of the invention to provide an improved simple computer for serially processing, in a pre-arranged sequence, information signals which are repeatedly accessible in a memory store, and which include output signals representing interim results which are retained and subsequently re-applied as input signals.

It is a further object of the invention to provide a reliable computer that performs digital computation by serially building up complex functions of Boolean variables through repeated performance of primitive logical operations upon selected information representing signals in a predetermined sequence, and which builds up other complex functions of Boolean variables by re-arranging the predetermined sequence.

The novel features which are believed characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as definition of the limits of the invention.

Figures 1, 2:
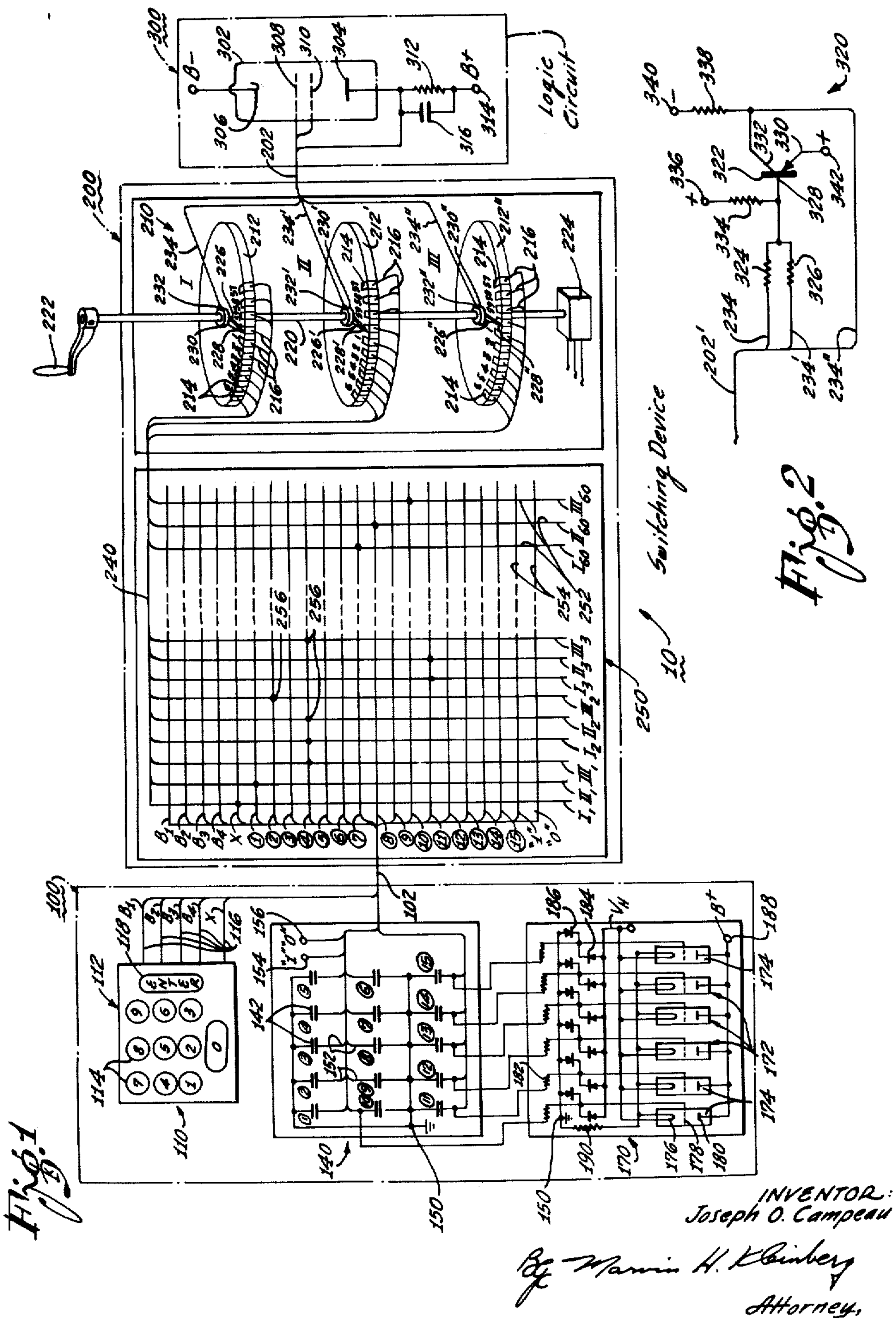
FIGURE 1 is a detailed block diagram of a preferred embodiment of a computer according to the present invention.
FIGURE 2 is a circuit diagram of an alternative logic circuit suitable for use in the computer of FIGURE 1, in which a transistor is used rather than a vacuum tube.

With reference now to FIGURE 1, there is shown a detailed block diagram of a preferred embodiment of a computer 10, according to the present invention. As illustrated, the computer 10 includes an information storage unit 100 which is connected by a first cable 102 to receive and transmit signals to a switching device 200. The switching device 200 is also connected, through a second cable 202, to both apply to and receive signals from a logic circuit 300.

As shown in FIGURE 1, the information storage unit 100 is sub-divided into three component elements, an input device 110, a memory store 140, and an output device 170. As is well known in the art, both the input device 110 and the output device 170 can be considered as auxiliary static stores of information and therefore are properly included within the information storage unit 100.

In the preferred embodiment of the invention, the input device 110 includes a 10-key keyboard 112 for the entry of input information. To simplify the task of the operator, the keyboard 112 converts a decimal digit, selected by energizing one of ten digit keys 114, into a binary number. Using well known, state-of-the-art techniques such as are illustrated, for example, in the above-mentioned Campeau application, each of the keys 114, when energized, generates a unique combination of four bilevel electrical signals to represent each of the decimal digits as a different binary number. As shown in the preferred embodiment, four input conductors 116, designated $B_1$, $B_2$, $B_3$, and $B_4$ are used for the parallel transmission of the digit-representing combination of input signals. An additional, "Enter" key 118 is provided to present an extra signal designated "X," on a fifth input conductor 116, to control the entry of information into the computer 10 as will be more fully described below.

The input conductors 116 are connected into the first cable 102 which connects the information storage unit 100 with the switching device 200. Alternative input devices are available which can serially enter the individual signals $\underline{B}_1$, $\underline{B}_2$, $\underline{B}_3$, $\underline{B}_4$, and "$\underline{X}$," on a single input conductor using well known multiplexing techniques. It is also feasible to connect the individual input conductors 116 directly into the switching device 200.

The information storage unit 100 also includes the main memory store 140 in which each one of a plurality of individual, discrete, capacitors 142, functions as a separate memory cell. One terminal of each of the capacitors 142 is connected to a source of common reference potential 150, indicated by the conventional ground symbol, and a second terminal of each capacitor 142 is connected to a different one of a plurality of individual signal conductors 152. A permanent source 154 of binary "1" representing signals and a permanent source 156 of binary "0" representing signals are provided in the main memory store 140 and these sources, too, are connected to ones of the individual signal conductors 152.

A memory capacitor 142, when charged to a high potential relative to the common reference potential represents a stored binary "1" and, when charged to a relatively low potential provides a "0" representing signal. Each individual capacitor 142 is capable of storing a single binary information signal. For identification, each memory cell has been given an encircled identification numeral, i.e., ① to ⑮ and the same encircled numeral has been applied to the conductor 152 which is connected to each cell.

In the present example, six of the memory capacitors 142, cells ⑩–⑮, are allocated for use as a storage register, each cell holding one of the individual bits of a six-bit binary number. An output or display device 170 is connected to the main memory store 140 to provide a visual indication of the number being stored. Each of the six cells of the storage register is connected to an individual one of six display elements 172 within the display device 170.

Each of the display elements 172 is a subminiature, indicator triode 174 having a cathode 176, a grid 178, and an anode 180 which indicates the state of the selected memory cells by means of a visible glow. The grid 178 of each triode 174 is connected through a grid resistor 182 to one of the memory capacitors 142 of register cells ⑩–⑮. A pair of high and low clamping diodes 184, 186, are connected to each grid 178 to limit the grid swing of the triode 174. All of the anodes 180 of the triodes 174 are commonly connected to a source of positive potential 188 and all cathodes 176 and the anodes of the high clamping diodes 184 are connected to a source of positive potential substantially lower than the positive source 188. The cathodes 176 are returned to the common reference source 150 through a cathode resistor 190. The anodes of the low clamping diodes 186 are connected to the common reference source 150. The anodes 180 are phosphor coated and glow when the triode 174 is conducting a current. The relatively high potential of a memory cell 142 storing a binary "1," clamped by the high diode 184 provides a sufficient bias to the connected grid 178 to maintain conduction in the triode 174, resulting in a brightly glowing anode 180. A memory cell 142 storing a binary "0" provides an output which, when clamped by the low diode 186, maintains the triode 174 in the cut-off state.

An indicator triode suitable for use in the present invention is commercially available under the trade designation "Amperex Tube Type 6977." In conduction, such a triode draws less than five microamperes of grid current which would be an insignificant drain on the charge of a memory cell in the "1" representing state. Using the 6977 tube, grid resistors 182 have a value of .1 megohm, and the potential sources are adjusted so that a current of 30 milliamperes flows in the cathode 176, a potential of 50 volts exists between anode 180 and cathode 176. For conduction, the grid 178 has a −1.0 volt potential relative to the cathode and for cut-off, −4.0 volts relative to the cathode.

The switching device 200 is also subdivided into the separate but interconnected elements of a three-deck rotary distributor or commutator which, for convenience, will be termed a switch 210 and a wiring matrix 250. Each deck 212, 212', 212'' of the switch 210 has a plurality of conductive segments 214 disposed about the periphery.

Adjacent segments 214 are electrically insulated from each other by the non-conductive material making up the deck itself. Each segment 214 is connected to a separate switching conductor 216.

The decks 212, 212', 212'' are identified by roman numerals I, II, III, respectively. The individual segments 214 and their associated switch conductors 216 are numbered consecutively on each deck in the clockwise direction as viewed in FIGURE 1. Each segment and conductor can then be identified by the deck and segment numbers, i.e., $I_1$, $II_1$, $III_1$. Each of the decks has 60 individual segments and conductors which are numbered $I_1$–$I_{60}$, $II_1$–$II_{60}$ and $III_1$–$III_{60}$.

A common drive shaft 220 is rotationally mounted in suitable bushings (not shown) and is coaxial with the decks of the switch 210. A handle 222 is fixed to one end of the shaft 220 for imparting rotary motion. The handle 222 may be manually operated or attached to a source of motion (not shown). Affixed to the opposite end of the shaft is a motor-generator 224 which may be used alternatively as a source of rotational energy for rotating the shaft 220 or as a source of electrical energy to the system if shaft rotation is provided from other sources.

The three decks are substantially identical in structure and accordingly, only deck I will be described in detail. It is to be understood that the similar parts of decks II and III are designated by corresponding primed and double primed numbers, respectively. A contacting wiper 226, fixedly mounted on the shaft 220 cooperatively engages deck I. The wiper 226 has an electrically conductive contact point 228 at the outer end for sequentially contacting the conductive segments 214 of the deck 212 as the shaft 220 rotates. The wiper 226 has a brush and slip ring assembly 230 electrically connected to the contact point 228 to provide a stationary common terminal 232 for the deck. An output conductor 234 is connected to the common terminal 232 and is combined into the second cable 202 which connects to the logic circuit 300. The individual switch conductors 216 connected to each segment 214, are also joined in a switch cable 240 which is connected to the wiring matrix 250.

As shown in FIGURE 1, the wiring matrix 250 has 180 vertical or column conductors 252 and 22 horizontal or row conductors 254. Each column conductor 252 is electrically connected to a different segment 214 through the associated individual switch conductor 216. For purposes of identification, each column conductor 252 bears the designation of the segment 214 to which it is connected. The first three column conductors 252 are therefore labeled $I_1$, $II_1$, and $III_1$.

Each horizontal or row conductor 254 is connected to a separate one of the input conductors 116 of the first cable 102 coming from the information storage unit 100. Each row conductor bears the designation of the element in the information storage unit 100 to which it is connected.

The three wipers 226, 226', and 226'' move together and are adjusted so that the correspondingly numbered segments on each deck are contacted at the same time. The time period during which a wiper is in contact with a segment may be considered an operating interval. In each successive operating intervals, therefore, a different group of three column conductors 252 are connected to the conductors of the second cable 202 and the logic circuit 300. The wiring matrix 250 is a ready means of interconnecting the individual segments of the rotary switch 210 to the individual elements of the information storage unit 100. Information signals can be processed in a regular, cyclical fashion in any desired order. At the intersections of the rows and columns, connection can be made either by physically interconnecting the wires, or by providing a suitable plugboard arrangement which can electrically connect intersections in non-permanent fashion. In FIGURE 1, a connection between row and column conductors is indicated by a heavy black dot 256 at their intersection.

The Sheffer operator, which is described at pages 88 and 89 of the book by Booth and Booth, "Automatic Digital Calculators," 2nd edition and which is illustrated in figure 9.15 constitutes the logic circuit 300. A tetrode 302 having an anode 304, a cathode 306, a first grid 308, and a second grid 310 is used to perform the stroke operation.

Input information signals are applied to the two grids 308 and 310 and the output of the circuit is taken from the anode 304. The anode 304 is further connected through an anode resistor 312 to a high level potential source 314. An anode capacitor 316 is added between the source 314 and the anode 304 in parallel with the anode resistor 312 to stabilize and hold the output of the tetrode 302 in response to the applied input signals. The first grid 308 is connected through a conductor in the second cable 202 to the common terminal 232 of deck I of the rotary switch 210. In similar fashion, the second grid 310 is connected to the common terminal 232' of deck II, and the anode 304 is connected to apply an output signal to the common terminal 232'' of deck III.

In operation, application of high level signals from the deck I and deck II common terminals 232, 232' to the first and second grids 308, 310, respectively, results in the application of a low level output signal to the deck III common terminal 232'' while a low level signal on either grid, or both, results in a high level output signal. These results are summarized in the following table which also repeats, for purposes of comparison, the stroke of applied signals $\underline{A}$ and $\underline{B}$.

*Table 3*

| Grid 308 | Grid 310 | Anode 304 | $\underline{A}$ | $\underline{B}$ | $\underline{A/B}$ |
|---|---|---|---|---|---|
| High | High | Low | 1 | 1 | 0 |
| Low | High | High | 0 | 1 | 1 |
| High | Low | High | 1 | 0 | 1 |
| Low | Low | High | 0 | 0 | 1 |

If relatively high level signals represent binary "1" and relatively low level signals represent binary "0," then the logic circuit 300 obviously performs the stroke function upon applied input signals.

A wiring table, Table 4 below, has been set forth in which are listed the various cells to which the segments are connected, in the order that the segments are contacted by their respective wipers. Also included in the table, is a logical function that is stored in the various memory cells as a bilevel signal during each operating interval. Each horizontal line of the table represents both an operation interval during which one segment is contacted on each of the decks, and, to simplify the interconnection of the row and column conductors of the wiring matrix, each row of the table also corresponds to a numbered segment of the rotary switch 210. Therefore, column T lists the segment numbers, column I contains the designation of the elements connected to each segment of deck I, column II contains the designation of the elements connected to each segment of deck II, and column III contains the designation of the elements connected to each segment of deck III.

The particular wiring scheme set forth below directs the computer to accept a four-bit binary number presented as a signal combination on four input lines, to add the number to a six-bit binary number stored in the memory, and to retain the result of the addition in the memory. At all times, a visual representation of the stored six-bit number is available in the display device. The brief sequence of operations set forth below demonstrates the inherent capability of the invention. Those skilled in the art will perceive that longer operating sequences can be written which will mechanize equations more complex than sum and carry to perform more complex computations. Reference is made, for example, to the logical equations for a general purpose computer set forth in the copending Campeau application. These equations can easily be generated by the present invention if adequate storage and switching capacity is provided.

In the remaining columns, the contents of the various memory cells, of the main memory store 140, are listed, expressed in terms of the logical functions that each stored signal represents. The special symbol $\underline{Y}$ is used to designate a special signal that prevents the multiple entry of input information and the significance of which is more fully explained below. The addend signals from the keyboard, appearing on the four entry lines $B_1$, $B_2$, $B_3$, $B_4$ are respectively designated $\underline{B}_1$, $\underline{B}_2$, $\underline{B}_3$, $\underline{B}_4$. The contents of cells ⑩ to ⑮ are considered the augend digits, $\underline{A}_1$–$\underline{A}_6$. The least significant digit, $\underline{A}_1$, is stored in cell ⑪. The more significant digits $\underline{A}_2$–$\underline{A}_5$ are in cells ⑫–⑮, respectively, and $\underline{A}_6$, the most significant digit of the number, is stored in cell ⑩.

*Table 4*

| | | | | MEMORY | | | | | | | | | | | | | | | |
|---|---|---|---|---|---|---|---|---|---|---|---|---|---|---|---|---|---|---|---|
| T | I | II | III | ① | ② | ③ | ④ | ⑤ | ⑥ | ⑦ | ⑧ | ⑨ | ⑩ | ⑪ | ⑫ | ⑬ | ⑭ | ⑮ |
| | | | | $\overline{\underline{X}}_o$ | | | | | | | | | $\underline{A}_6$ | $\underline{A}_1$ | $\underline{A}_2$ | $\underline{A}_3$ | $\underline{A}_4$ | $\underline{A}_5$ |
| 1 | X | ① | ④ | | | | $\overline{\underline{X}}+\underline{X}_0=\overline{\underline{Y}}$ | | | | | | | | | | | |
| 2 | ④ | ④ | ② | | $\underline{Y}$ | | | | | | | | | | | | | |
| 3 | ⑪ | ⑪ | ④ | | | | $\overline{\underline{A}}_1$ | | | | | | | | | | | |
| 4 | X | X | ① | $\overline{\underline{X}}_n$ | | | | | | | | | | | | | | |
| 5 | $B_1$ | ② | ⑤ | | | | | $\overline{\underline{B}}_1+\overline{\underline{Y}}=\overline{\underline{B}}'_1$ | | | | | | | | | | |
| 6 | ⑤ | ⑤ | ⑥ | | | | | | $\underline{B}_1'$ | | | | | | | | | |
| 7 | ④ | ⑤ | ⑦ | | | | | | | $\underline{A}_1+\underline{B}_1'$ | | | | | | | | |
| 8 | ⑪ | ⑥ | ⑧ | | | | | | | | $\overline{\underline{A}}_1+\overline{\underline{B}}'_1=\overline{\underline{C}}_1$ | | | | | | | |
| 9 | ⑧ | ⑦ | ⑥ | | | | | | $\overline{\underline{A}_1\oplus\underline{B}'_1}$ | | | | | | | | | |
| 10 | ⑥ | ⑥ | ⑪ | | | | | | | | | | | $\underline{A}_1$ | | | | |
| 11 | ⑧ | ⑧ | ③ | | | $\underline{C}_1$ | | | | | | | | | | | | |
| 12 | ⑫ | ⑫ | ④ | | | | $\overline{\underline{A}}_2$ | | | | | | | | | | | |

*Table 4*—Continued

| T | I | II | III | ① | ② | ③ | ④ | ⑤ | ⑥ | ⑦ | ⑧ | ⑨ | ⑩ | ⑪ | ⑫ | ⑬ | ⑭ | ⑮ |
|---|---|---|---|---|---|---|---|---|---|---|---|---|---|---|---|---|---|---|
| | | | | MEMORY | | | | | | | | | | | | | | |
| | | | | $\overline{X}_0$ | | | | | | | | | $A_6$ | $A_1$ | $A_2$ | $A_3$ | $A_4$ | $A_5$ |
| 13 | $B_2$ | ② | ⑤ | | | | | $\overline{B}_2+\overline{Y}=\overline{B}'_2$ | | | | | | | | | | |
| 14 | ⑤ | ⑤ | ⑥ | | | | | | $B'_2$ | | | | | | | | | |
| 15 | ④ | ⑤ | ⑦ | | | | | | | $A_2+B'_2$ | | | | | | | | |
| 16 | ⑫ | ⑥ | ⑤ | | | | | $\overline{A}_2+\overline{B}'_2$ | | | | | | | | | | |
| 17 | ⑦ | ⑤ | ⑥ | | | | | | $\overline{A_2\oplus B'_2}$ | | | | | | | | | |
| 18 | ⑥ | ⑥ | ④ | | | | $A_2\oplus B'_2$ | | | | | | | | | | | |
| 19 | ⑧ | ④ | ⑨ | | | | | | | | | $C_1+(\overline{A_2\oplus B'_2})$ | | | | | | |
| 20 | ③ | ⑥ | ⑧ | | | | | | | | $\overline{C}_1+(A_2\oplus B'_2)$ | | | | | | | |
| 21 | ⑧ | ⑨ | ⑫ | | | | | | | | | | | | $A_2$ | | | |
| 22 | ③ | ⑦ | ④ | | | | $\overline{C}_1+(\overline{A_2+B'_2})$ | | | | | | | | | | | |
| 23 | ④ | ⑤ | ③ | | | $C_2$ | | | | | | | | | | | | |
| 24 | ⑬ | ⑬ | ④ | | | | $\overline{A}_3$ | | | | | | | | | | | |
| 25 | $B_1$ | ② | ⑤ | | | | | $\overline{B}_3+\overline{Y}=\overline{B}'_3$ | | | | | | | | | | |
| 26 | ⑤ | ⑤ | ⑥ | | | | | | $B'_3$ | | | | | | | | | |
| 27 | ④ | ⑤ | ⑦ | | | | | | | $A_3+B_3'$ | | | | | | | | |
| 28 | ⑬ | ⑥ | ⑤ | | | | | $\overline{A}_3+\overline{B}'_3$ | | | | | | | | | | |
| 29 | ⑦ | ⑤ | ⑥ | | | | | | $\overline{A_3\oplus B'_3}$ | | | | | | | | | |
| 30 | ⑥ | ⑥ | ④ | | | | $A_3\oplus B_3'$ | | | | | | | | | | | |
| 31 | ③ | ③ | ⑧ | | | | | | | | $\overline{C}_2$ | | | | | | | |
| 32 | ⑧ | ④ | ⑨ | | | | | | | | | $C_2+(\overline{A_3\oplus B'_3})$ | | | | | | |
| 33 | ③ | ⑥ | ④ | | | | $\overline{C}_2+(A_3\oplus B_3')$ | | | | | | | | | | | |
| 34 | ④ | ⑨ | ⑬ | | | | | | | | | | | | | $A_3$ | | |
| 35 | ③ | ⑦ | ⑥ | | | | | | $\overline{C}_2+(\overline{A_3+B_3'})$ | | | | | | | | | |
| 36 | ⑤ | ⑥ | ③ | | | $C_3$ | | | | | | | | | | | | |
| | | | | $\overline{X}_n$ | $Y$ | $\overline{C}_3$ | $\overline{C}_2+(A_3\oplus B'_3)$ | $\overline{A}_3+\overline{B}'_3$ | $\overline{C}+(\overline{A_3+B'_3})$ | $A_3+B'_3$ | $\overline{C}_2$ | $C_2+(\overline{A_3\oplus B_3'})$ | | | | | | |
| 37 | ⑭ | ⑭ | ④ | | | | $\overline{A}_4$ | | | | | | | | | | | |
| 38 | $B_4$ | ② | ⑤ | | | | | $\overline{B}_4+\overline{Y}=\overline{B}_4'$ | | | | | | | | | | |
| 39 | ⑤ | ⑤ | ⑥ | | | | | | $B_4'$ | | | | | | | | | |
| 40 | ④ | ⑤ | ⑦ | | | | | | | $A_4+B_4'$ | | | | | | | | |
| 41 | ⑭ | ⑥ | ⑤ | | | | | $\overline{A}_4+\overline{B}_4'$ | | | | | | | | | | |
| 42 | ⑤ | ⑦ | ⑥ | | | | | | $\overline{A_4\oplus B_4'}$ | | | | | | | | | |
| 43 | ⑥ | ⑥ | ④ | | | | $A_4\oplus B_4'$ | | | | | | | | | | | |
| 44 | ③ | ③ | ⑧ | | | | | | | | $\overline{C}_3$ | | | | | | | |
| 45 | ⑧ | ④ | ⑨ | | | | | | | | | $C_3+(\overline{A_4\oplus B_4'})$ | | | | | | |
| 46 | ③ | ⑥ | ④ | | | | $\overline{C}_3+(A_4\oplus B_4')$ | | | | | | | | | | | |
| 47 | ④ | ⑨ | ⑭ | | | | | | | | | | | | | | $A_4$ | |
| 48 | ③ | ⑦ | ⑥ | | | | | | $\overline{C}_3+(A_4+B_4')$ | | | | | | | | | |
| 49 | ⑤ | ⑥ | ③ | | | $C_4$ | | | | | | | | | | | | |
| 50 | ⑮ | ⑮ | ④ | | | | $\overline{A}_5$ | | | | | | | | | | | |
| 51 | ③ | ③ | ⑤ | | | | | $\overline{C}_4$ | | | | | | | | | | |
| 52 | ⑮ | ⑤ | ⑥ | | | | | | $\overline{A}_5+C_4$ | | | | | | | | | |
| 53 | ③ | ④ | ⑦ | | | | | | | $A_5+\overline{C}_4$ | | | | | | | | |
| 54 | ⑮ | ③ | ⑧ | | | | | | | | $\overline{A}_5+\overline{C}_4=\overline{C}_5$ | | | | | | | |
| 55 | ⑧ | ⑧ | ③ | | | $C_5$ | | | | | | | | | | | | |
| 56 | ⑥ | ⑦ | ⑮ | | | | | | | | | | | | | | | $A_5$ |
| 57 | ⑩ | ⑧ | ⑦ | | | | | | | $\overline{A}_6+C_5$ | | | | | | | | |
| 58 | ⑩ | ⑩ | ⑨ | | | | | | | | | $\overline{A}_6$ | | | | | | |
| 59 | ⑨ | ③ | ⑧ | | | | | | | | $A_6+\overline{C}_5$ | | | | | | | |
| 60 | ⑦ | ⑧ | ⑩ | | | | | | | | | | $A_6$ | | | | | |

At the beginning of a cycle of operation, it may be assumed that a signal $\overline{X}_0$ is stored in cell ① representing the complement of the "Enter" key signal that was presented during the prior operating cycle. In cell ②, a signal representing the signal "$\underline{Y}$," remains from the prior cycle. Cell ③ contains a carry bit generated during the prior cycle and cells ① through ⑨ each contain a composite signal used in forming the result of the prior operational cycle. Cell ⑩ contains the most significant bit of the accumulator, $\underline{A}_6$, and cells ⑪ through ⑮ contain, in ascending order, the first five bits of the accumulated number $\underline{A}_1$ through $\underline{A}_5$, respectively..

In each interval, the wipers, in unison, contact successively increasing numbered segments of their repective decks. In the first operating interval, $T_1$, the signal from the entry key, $\underline{X}$, is combined with the signal in ①, $(\overline{X_0})$ and the combined signal $(\underline{X}+\underline{X}_0)$, representing the complement of the signal "$\underline{Y}$" is stored in ④. At the second interval, $T_2$, the signal in ④ is complemented to become the new signal "$\underline{Y}$" and is placed in cell ② where it is held for the remainder of the cycle to control the entry of signals from the keyboard. At $T_3$, the Enter key signal, $\underline{X}$, is complemented and stored in cell ① as the new complement signal $\overline{X_n}$ and is held until the next operational cycle when it is automatically redesignated the old signal $\overline{X}_0$.

At $T_4$, the least significant bit in the accumulator, $\underline{A}_1$, is complemented and placed in cell ④ to start the actual computation, corresponding to Equation 7, above. At $T_5$, the least significant bit of the addend, represented by a signal on entry line $B_1$ is combined with signal "$\underline{Y}$" and stored in the cell ⑤. The contents of cell ⑤ are complemented at $T_6$ and placed in cell ⑥. This composite signal is designated $\underline{B}_1'$, representing the "and" combination of $B_1$ and $\underline{Y}$. For the purpose of computation, $\underline{B}'$ is substituted for $\underline{B}$ in Equations 8 through 18. $\underline{B}_1'$ is used to prevent the entry of $B_1$ into the accumulator in every successive cycle during which the $B_1$ signal line remains energized, since "$\underline{Y}$" is a "1" only in the cycle following the actuation of the Enter key.

At this time, signals representing $\underline{A}$, $\overline{A}$, $\underline{B}'$, $\overline{B'}$ are available in different cells of the memory. The logical operations represented by Equations 9 through 18, set out above, can then be performed. For the convenience of the reader, Equations 7–18, modified by the replacement of $\underline{B}$ with $\underline{B}'$, are repeated as Equations 7′–18′, in Table 5, below.

*Table 5*

| Input No. 1 | | Input No. 2 | Result | |
|---|---|---|---|---|
| $\underline{A}$ | / | $\underline{A}$ | $\overline{A}$ | (7′) |
| $\underline{B'}$ | / | $\underline{B'}$ | $\overline{B'}$ | (8′) |
| $\overline{A}$ | / | $\overline{B'}$ | $\underline{A+B'}$ | (9′) |
| $\underline{A}$ | / | $\underline{B'}$ | $\overline{A}+\overline{B'}$ | (10′) |
| $\underline{A+B'}$ | / | $\overline{A+B'}$ | $\underline{AB'}+\overline{AB'}=\underline{A+B'}$ | (11′) |
| $\overline{A\oplus B'}$ | / | $\overline{A\oplus B'}$ | $\underline{A\oplus B'}$ | (12′) |
| $\underline{C}$ | / | $\overline{A\oplus B'}$ | $\overline{C}+A\oplus B'$ | (13′) |
| $\underline{C}$ | / | $\underline{C}$ | $\overline{C}$ | (14′) |
| $\overline{C}$ | / | $\underline{A\oplus B'}$ | $C+\overline{A\oplus B'}$ | (15′) |
| $\overline{C}+(A\oplus B')$ | / | $\overline{C+A\oplus B'}$ | $C\oplus A\oplus B'=\underline{\underline{Sum}}$ | (16′) |
| $\underline{A+B'}$ | / | $\underline{C}$ | $\overline{C}+\overline{A+B'}$ | (17′) |
| $\overline{A}+\overline{B'}$ | / | $\overline{C}+\overline{A+B'}=\overline{\overline{A}+\overline{B'}}+\overline{\overline{C}+\overline{A+B'}}=AB'+C(A+B')=\underline{\underline{Carry}}$ | | (18′) |

It can be seen that the operations represented by Equations 9′, 10′, 11′, and 12′ are carried out at intervals $T_7$–$T_{10}$, respectively by comparison of Table 4 with equations of Table 5. At $T_7$, signals in cell ④ and cell ⑤ are combined to produce a signal which is stored in cell ⑦. At $T_8$ the $\underline{A}_1$ signal from cell ⑪ is combined with the $\underline{B}'_1$ from cell ⑥ and the result $(\overline{A_1}+\overline{B'_1})$, is stored in cell ⑧, which in the formation of the least significant digit, represents the complement of the carry term for the next addition.

At $T_9$, the contents of cells ⑦ and ⑧ are combined to form $(\overline{A_1\oplus B'_1})$, which is complemented at $T_{10}$ to produce $(\underline{A_1\oplus B'_1})$ the sum digit, of the first addition since there is no carry to consider. The sum signal represents the new $\underline{A}_1$ digit and is therefore stored in cell ⑪, the contents of which are displayed at all times. At $T_{11}$, the term being held in cell ⑧ is complemented to form the carry $\underline{C}_1$ and is stored in cell ③. Cell ③ is subsequently used to hold a carry in all subsequent operations of the cycle.

After the new least significant digit is formed, the operations, represented by Equations 9′–18′, are repeated to form the next sum and carry digits in intervals $T_{15}$ to $T_{23}$. At $T_{12}$, the second least significant digit of the augend $\underline{A}_2$ is taken from cell ⑫ and is complemented into cell ④. At $T_{13}$, the next most significant digit signal, on entry line $B_2$, is combined with signal "$\underline{Y}$" as in $T_5$, and the result, designated $\overline{B'_2}$ is placed in cell ⑤. $\underline{B}'_2$ is formed by complementing the contents of the cell ⑤ into cell ⑥ at $T_{14}$. As in $T_7$, the signals in cells ④ and ⑤ are combined at $T_{15}$ and placed in cell ⑦. At $T_{16}$, an $\underline{A}_2$ signal from cell ⑫ is combined with a $\underline{B}'_2$ signal from cell ⑥ and the result $(\overline{A_2}+\overline{B'_2})$, is placed in cell ⑤. At the next operating interval, $T_{17}$, the contents of cells ⑤ and ⑦ are combined to form $\overline{A_2\oplus B'_2}$ which is stored in cell ⑥. This signal is complemented and placed in cell ④ at $T_{18}$. At $T_{19}$, the complement of the prior carry $\overline{C_1}$, held in cell ⑧, is combined with $\underline{A_2\oplus B'_2}$ and placed in cell ⑨. At $T_{20}$, the carry signal $\underline{C}_1$ stored in cell ③ is combined with $(\overline{A\oplus B'_2})$ from cell ⑥ and placed in cell ⑧.

As may be seen from Equation 16′, the stroke operation, performed upon the contents of cells ⑧ and ⑨, results in the function $(\underline{A}_2\oplus\underline{B}'_2\oplus\underline{C}_1)$, which is the sum digit for the second accumulator digit $\underline{A}_2$ and which is placed in cell ⑫. At $T_{22}$, the carry $\underline{C}_1$ is combined with the signal in cell ⑦, $(\underline{A}_2+\underline{B}'_2)$, and placed in cell ④, and at $T_{23}$ is combined with the signals in cell ⑤, $(\overline{A_2}+\overline{B'_2})$ to result in the carry digit, $\underline{C}_2$, as set forth in Equation 18′. The carry digit $\underline{C}_2$ is then placed in cell ③.

The operation from $T_{24}$ through $T_{36}$ is substantially identical to the above described operation from $T_{12}$ through $T_{23}$, as is the operation from $T_{37}$ through $T_{49}$. At the end of $T_{49}$, all of the addend input digits from signal lines $B_1$–$B_4$ have been entered, and it is only necessary to propagate the carry bits into the most significant digits of the stored number. Therefore, at $T_{50}$, the second most significant digit $\underline{A}_5$, is complemented and placed in cell ④. At $T_{51}$, the carry digit $\underline{C}_4$, in cell ③ is complemented and placed in cell ⑤. At $T_{52}$, the contents of cells ⑮ and ⑤ are combined, placing ($\overline{\underline{A}_5}+\underline{C}_4$) in cell ⑥ and, at $T_{53}$, the contents of cell ③ and cell ④ are combined and placed in cell ⑦. At $T_{54}$, $\underline{A}_5$ and $\underline{C}_4$ are combined into $\overline{\underline{A}_5\cdot\underline{C}_4}$, which is placed in cell ⑧ and is the complement of the fifth carry digit, $\underline{C}_5$. The signal in cell ⑧ is then complemented and placed in cell ③. At $T_{56}$, the signals in cells ⑥ and ⑦ are combined to form ($A_5 \oplus C_4$) which represents the new fifth bit of the accumulator, $\underline{A}_5$. At the next interval, the most significant bit $\underline{A}_6$, which is stored in cell ⑩, is combined with $\overline{\underline{C}}_5$ in cell ⑧ and placed in cell ⑦. At $T_{58}$, $\underline{A}_6$ is complemented into cell ⑨. At $T_{59}$, a signal representing ($\underline{A}_6+\overline{\underline{C}}_5$ is formed and placed in cell ⑧ and at $T_{60}$, is combined with the signal in cell ⑦ to form ($\underline{A}_6 \oplus \underline{C}_5$), the new most significant accumulator bit, $\underline{A}_6$ in cell ⑩.

After sixty segments of each of the three synchronized commutators have been contacted, a binary coded decimal digit, represented by signals on each of four input lines $B_1$ through $B_4$, is added to a six-bit straight binary number to form a new six-bit binary number which is stored in the main memory store 140.

An alternative form of logic circuit 320 using a transistor 322 instead of a tetrode 302 is illustrated in FIGURE 2. A connecting cable 202' (which may be identical with the cable 202 of FIGURE 1) connects the logic circuit 320 with the remainder of the computer 10 as shown in FIGURE 1. Two of the output conductors 234, 234' of the cable 202' are respectively connected to the common terminals of decks I and II, 232, 232', and a third output conductor 234'' is connected to the common terminal of deck III, 232''.

Input signals are applied, for example, by the first output conductor 234 to a first resistor 324 and by the second output conductor 234' to a second resistor 326. The resistors 324, 326 are connected in parallel to the transistor 322 which has a base 328, an emitter 330 and a collector 332. The first and second resistors 324, 326 are connected to the transistor base 328 which is also connected, through a base bias resistor 334 which is connected to a source of positive base bias 336. The transistor illustrated is an NPN but, with suitable change of bias and voltage levels, could easily be a PNP. The collector 332 of the transistor 322 is connected through a collector resistor 338 to a relatively low potential source 340. The emitter 330 is connected to a relatively high potential source 342. The output of the logic circuit 320 is taken between the collector 332 and the collector resistor 338.

In operation, the bias levels and potential sources are adjusted so that application of a high level signal on both of the inputs results in a low level output at the collector. However, if either of the input signals is at a low level, the circuit output is at the high level. The output of this circuit, therefore, represents the stroke function of the applied input signals, if binary "1's" and "0's" are represented by high and low level signals, respectively.

Still another circuit which performs the stroke operation has been described in detail in an article entitled "An Algebraic Theory for Use in Digital Computer Design" by E. C. Nelson in the Transactions of the IRE, volume EC–3, number 3, dated September 1954. Many other circuits too, are available to produce output signals representing the stroke function of the applied input signals.

Figure 3:
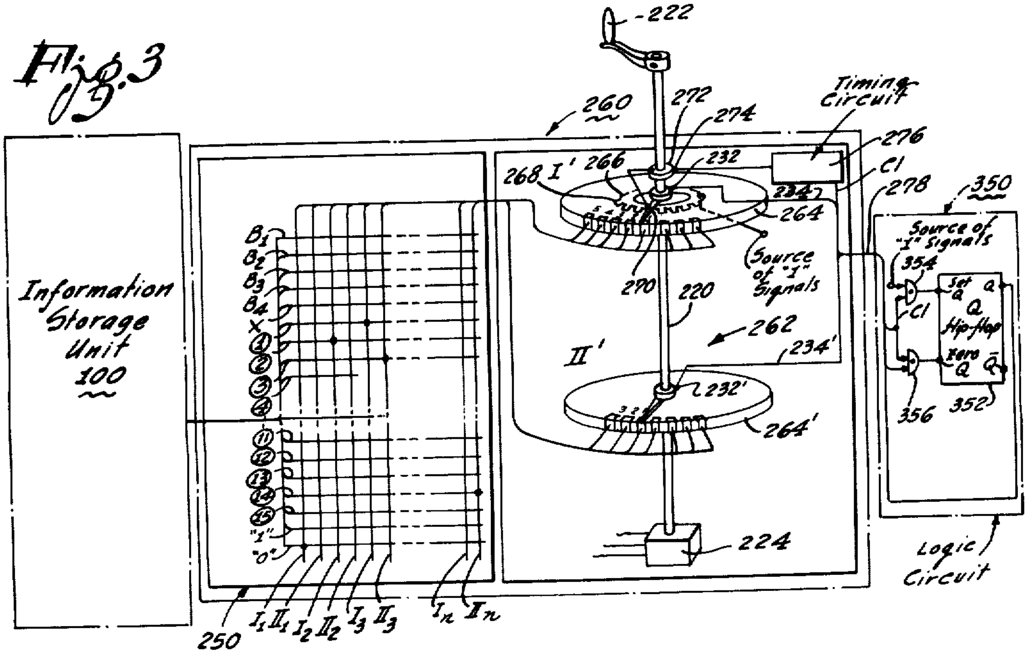
FIGURE 3 is a detailed block diagram, of an alternative computer according to the present invention.

An alternative embodiment of a computer according to the present invention is illustrated in FIGURE 3. Those elements of FIGURE 1 that may be adopted without change have been shown here as boxes only, and include the information storage unit 100 and the wiring matrix 250 in a switching device 260.

A rotary switch 262 within the switching device 260 of FIGURE 3 differs from the switch 210 of FIGURE 1 mainly in that two decks 264, 264' are used rather than the three of FIGURE 1. However, where the parts are the same, the same reference numerals have been applied. The first deck 264 is designated deck I' and is provided with a concentric conductive ring 266 having a plurality of radial projections 268, each in alignment with a conductive segment 214 at the periphery of the deck. A second contact point 270 is attached to the wiper 226 of deck I', 264, and is positioned to engage only the conductive projections 268. The second contact point 270 is connected to a brush and slip ring combination 272 which in turn, is connected to a timing terminal 274. A timing circuit 276 is connected to the timing terminal 274 to produce a timing signal, C1, each time a projection 268 is contacted, which synchronizes operations within an alternative logic circuit 350. The second deck 264' of the switch 262 has been designated deck II' and, except for the number of conductive segments 214 thereon, is substantially identical in structure to either deck II or deck III of switch 210 of FIGURE 1 and serves as an output distributor in the alternative embodiment of FIGURE 3.

A connecting cable 278, containing conductors connected to the common terminals 232, 232' of decks I' and II', and also to the timing circuit 276 output, is applied to the alternative logic circuit 350.

The alternative logic circuit 350 is here shown as a bistable multivibrator or flip-flop circuit 352, which, being well known in the art, will not be described in detail herein. As shown, the flip-flop 352 has been designated the Q flip-flop and has two input terminals, designated Set Q and Zero Q and two corresponding output terminals Q and $\overline{Q}$. Binary "1" representing signals applied to the Set Q terminal places the Q flip-flop 282 in one of its two stable states, characterized by a high level output signal $\underline{Q}$ at the Q terminal and, simultaneously, a relatively low level output signal at the $\overline{Q}$ terminal. Application of the binary "1" representing signal to the Zero Q terminal places the Q flip-flop 282 in the other of its stable states, with a relatively high level output signal, $\overline{\underline{Q}}$, at the $\overline{Q}$ terminal and a relatively low level output signal at the Q terminal. Simultaneous application of "1" representing signals to both input terminals triggers the flip-flop to its opposite state.

A pair of synchronizing, two-input "and" gates 354, 356 are respectively connected to the two input terminals of the Q flip-flop 352. One input of each gate is connected through a conductor of cable 278 to the timing circuit 276 so that both gates are simultaneously enabled at the occurrence of a timing pulse C1. The second input to the first "and" gate 284 is connected to a source of "1" representing signals and the output of the gate is applied to the Set Q terminal of the flip-flop 352. The second input to the second "and" gate 286 is connected through a second conductor of cable 278 to the common terminal 232' of deck II', and the second gate output is applied to the Zero Q terminal. The Q output terminal of the flip-flop is connected through a third conductor of cable 278 to the common terminal 232' of deck II' 264'.

In operation, the timing circuit 276 synchronizes the application of signals to the Q flip-flop, thereby preventing the flip-flop from assuming more than one state during any operating interval.

Application of input signals to the Zero Q terminal of the flip-flop produces output signals at the Q output terminal, which correspond to the stroke function of a Boolean variable, represented by an input signal, and a second Boolean variable, represented by the state of the Q flip-flop. In the following table, illustrating this relationship, the state of the flip-flop is specified by the output at the Q terminal. $\underline{Q}_o$ represents the old or present state of the Q flip-flop and $\underline{Q}_n$ represents the new state that the Q flip-flop will assume after the application of input signals.

*Table 6*

| Set Q | Zero Q | $\underline{Q}_o$ | $\underline{Q}_n$ |
|---|---|---|---|
| 1 | 0 | 0 | 1 |
| 1 | 1 | 0 | 1 |
| 1 | 0 | 1 | 1 |
| 1 | 1 | 1 | 0 |

From Table 6 above, it may be seen that in those instances where the Zero Q input is a "1" at the occurrence of the timing signal C1, the flip-flop is triggered to the opposite conductive state. If "0" input is applied to the Zero Q terminal, the flip-flop always assumes the "1" representing state, providing a high level signal $\underline{Q}$ at the Q output terminal.

In the computer of FIGURE 3, only one input signal is applied to the logic circuit 350 from the switch 262 each timing interval. A source of "1" representing signals and "0" representing signals is provided in the information storage unit 100 to simplify the operations of complementation and clearing of the flip-flop. Referring to Table 6 above, the Q flip-flop can always be placed in the "1" state by application of a "0" signal to the Zero Q terminal. When the flip-flop is in the "1" state, application of a "1" signal to the Zero Q terminal triggers the flip-flop complementing it to the "0" state. In an operational sequence, after an interim result signal has been formed and stored in the main memory store 140, the logic circuit 350 can be "cleared" and set to a predetermined "1" or "0" state to start the formation of the next interim result.

In the preferred embodiment, it was not necessary to clear the logic circuit 300, since the prior state of the logic circuit did not affect the result. However, for those operations where a complement of a signal is needed, application of a "1" representing signal on one of the inputs to the logic circuit could produce the complement of the signal applied to the other input rather than applying the same signal to both inputs.

A wiring table, similar to that set forth in Table 4 above for the preferred computer of FIGURE 1, has been prepared for the alternative computer of FIGURE 3. The operational sequence has been arranged to perform the same computation as in the preferred embodiment, and, to the extent possible, follows the equations of Table 5. As before, a four-bit binary number is added to a six-bit binary number stored in the memory and the result is stored. In the table below, the entries under column I' represent the connections to be made to the various segments of deck I' 264 and the items in column II' correspondingly represent the connections to be made to selected segments of deck II' 264'.

Because the logic circuit 350 actively participates in the formation of interim result signals, every operating interval is not necessarily productive of an output signal that must be stored. Accordingly, several rows of column II' are left blank, indicating that there is no result to be stored at that interval and therefore, the corresponding segment of deck II' is not connected to a row conductor in the wiring matrix 250, as may be seen in FIGURE 3.

The column entitled Logical Operator lists the logical functions represented by the state of the logic circuit 350 at each operating interval. The function listed represents the stroke of the applied input signal from column I' and the signal in the logical operator at the end of the preceding interval. The remaining columns list the signals that are stored in the main memory store 140 in the memory cell corresponding to the column designation.

*Table 7*

| T | I | II | Logical Operator | ① ② ③ ④ | ⑤ | ⑥ | ⑦ | ⑧ | ⑨ ⑩ ⑪ ⑫ ⑬ ⑭ |
|---|---|---|---|---|---|---|---|---|---|
| O | | | | $\underline{X}_o$ | | | | | $\underline{A}_1$ $\underline{A}_2$ $\underline{A}_3$ $\underline{A}_4$ $\underline{A}_5$ $\underline{A}_6$ |
| 1 | O | | 1 | | | | | | |
| 2 | ① | | $\overline{\underline{X}}_o$ | | | | | | |
| 3 | X | ② | $\overline{\underline{X}}+\underline{X}_o=\overline{\underline{Y}}$ | $\overline{\underline{Y}}$ | | | | | |
| 4 | O | | 1 | | | | | | |
| 5 | X | | $\overline{\underline{X}}_n$ | | | | | | |
| 6 | 1 | ① | $\underline{X}_n$ | $\underline{X}_n$ | | | | | |
| 7 | O | | 1 | | | | | | |
| 8 | ② | | $\underline{Y}$ | | | | | | |
| 9 | $B_1$ | ⑤ | $\overline{\underline{B}}_1+\overline{\underline{Y}}$ | | $\overline{\underline{B}}_1'$ | | | | |
| 10 | 1 | | $\underline{B}_1'$ | | | | | | |
| 11 | ⑨ | ④ | $\overline{\underline{A}}_1+\overline{\underline{B}}_1'=\overline{\underline{C}}_1$ | $\overline{\underline{C}}_1$ | | | | | |
| 12 | 1 | ③ | $\underline{A}_1\underline{B}_1'=\underline{C}_1$ | $\underline{C}_1$ | | | | | |
| 13 | O | | 1 | | | | | | |
| 14 | ⑨ | | $\overline{\underline{A}}_1$ | | | | | | |
| 15 | ⑤ | | $\underline{A}_1+\underline{B}_1'$ | | | | | | |
| 16 | ④ | | $\overline{\underline{A}_1\oplus\underline{B}_1'}$ | | | | | | |
| 17 | 1 | ⑨ | $\underline{A}_1\oplus\underline{B}_1'$ | | | | | | $\underline{A}_1$ |
| 18 | O | | 1 | | | | | | |
| 19 | ② | | $\underline{Y}$ | | | | | | |
| 20 | $B_2$ | ⑦ | $\overline{\underline{B}}_2+\overline{\underline{Y}}=\overline{\underline{B}}_2'$ | | | | $\overline{\underline{B}}_2'$ | | |
| 21 | 1 | | $\underline{B}_2'$ | | | | | | |
| 22 | ⑩ | ⑧ | $\overline{\underline{A}}_2+\overline{\underline{B}}_2'$ | | | $\overline{\underline{A}}_2+\overline{\underline{B}}_2'$ | | | |

*Table 7*—Continued

| T | I | II | Logical Operator | ① ② ③ ④ | ⑤ | ⑥ | ⑦ | ⑧ | ⑨ ⑩ ⑪ ⑫ ⑬ ⑭ |
|---|---|---|---|---|---|---|---|---|---|
| O | | | | $X_0$ | | | | | $\underline{A}_1$ $\underline{A}_2$ $\underline{A}_3$ $\underline{A}_4$ $\underline{A}_5$ $\underline{A}_6$ |
| 23 | O | | 1 | | | | | | |
| 24 | ⑩ | | $\overline{A}_2$ | | | | | | |
| 25 | ⑦ | ⑤ | $\underline{A}_2+\underline{B}_2'$ | ---- | $\underline{A}_2+\underline{B}_2'$ | | | | |
| 26 | ⑥ | ⑦ | $\overline{A_2\oplus B_2'}$ | ---- | ---- | ---- | $\overline{A_2\oplus B_2'}$ | | |
| 27 | ③ | ⑧ | $\overline{C}_1+(\underline{A}_2\oplus\underline{B}_2')$ | ---- | ---- | ---- | ---- | $\overline{C}_1+(\underline{A}_2\oplus\underline{B}_2')$ | |
| 28 | O | | 1 | | | | | | |
| 29 | ⑦ | | $\underline{A}_2\oplus\underline{B}_2'$ | | | | | | |
| 30 | ④ | | $\underline{C}_1+(\overline{A_2\oplus B_2'})$ | | | | | | |
| 31 | ⑧ | ⑩ | $\underline{A}_2\oplus\underline{B}_2'\oplus\underline{C}_1$ | ---- | ---- | ---- | ---- | ---- | $\underline{A}_2$ |
| 32 | O | | 1 | | | | | | |
| 33 | ④ | | $\underline{C}_1$ | | | | | | |
| 34 | ⑤ | | $\overline{C}_1+\overline{A_2+B_2'}$ | | | | | | |
| 35 | ⑥ | ③ | $\underline{A}_2\underline{B}_2'+\underline{C}_1(\underline{A}_2+\underline{B}_2')$ | $\underline{C}_2$ | | | | | |
| 36 | 1 | ④ | $\overline{C}_2$ | $\overline{C}_2$ | | | | | |
| | | | $\overline{C}_2$ | $\underline{X}_0$ $\underline{\overline{Y}}$ $\underline{C}_2$ $\overline{C}_2$ | | | | | |
| 37 | O | | 1 | | | | | | |
| 38 | ② | | $\underline{Y}$ | | | | | | |
| 39 | $B_3$ | ⑤ | $\overline{B}_3+\overline{Y}=\overline{B}_3'$ | ---- | $\overline{B}_3'$ | | | | |
| 40 | 1 | | $\underline{B}_3'$ | | | | | | |
| 41 | ⑪ | ⑥ | $\overline{A}_3+\overline{B}_3'$ | ---- | ---- | $\overline{A}_3+\overline{B}_3'$ | | | |
| 42 | O | | 1 | | | | | | |
| 43 | ⑪ | | $\overline{A}_3$ | | | | | | |
| 44 | ⑤ | ⑦ | $\underline{A}_3+\underline{B}_3'$ | ---- | ---- | ---- | $\underline{A}_3+\underline{B}_3'$ | | |
| 45 | ⑥ | ⑤ | $\overline{A_3\oplus B_3'}$ | ---- | $\overline{A_3\oplus B_3'}$ | | | | |
| 46 | ③ | ⑧ | $\overline{C}_2+(\underline{A}_3\oplus\underline{B}_3')$ | ---- | ---- | ---- | ---- | $\overline{C}_2+(\underline{A}_3\oplus\underline{B}_3')$ | |
| 47 | O | | 1 | | | | | | |
| 48 | ⑤ | | $\underline{A}_3\oplus\underline{B}_3'$ | | | | | | |
| 49 | ④ | | $\underline{C}_2+(\overline{A_3\oplus B_3'})$ | | | | | | |
| 50 | ⑧ | ⑪ | $\underline{A}_3\oplus\underline{B}_3'\oplus\underline{C}_2$ | ---- | ---- | ---- | ---- | ---- | $\underline{A}_3$ |
| 51 | O | | 1 | | | | | | |
| 52 | ④ | | $\underline{C}_2$ | | | | | | |
| 53 | ⑦ | | $\overline{C}_2+(\overline{A_3+B_3'})$ | | | | | | |
| 54 | ⑥ | ③ | $\underline{A}_3\underline{B}_3'+\underline{C}(\underline{A}_3+\underline{B}_3')$ | $\underline{C}_3$ | | | | | |
| 55 | 1 | ④ | ---- | $\overline{C}_3$ | | | | | |
| 56 | O | | 1 | | | | | | |
| 57 | ② | | $\underline{Y}$ | | | | | | |
| 58 | $B_4$ | ⑤ | $\overline{B}_4+\overline{Y}=\overline{B}_4'$ | ---- | $\overline{B}_4$ | | | | |
| 59 | 1 | | $\underline{B}_4'$ | | | | | | |
| 60 | ⑫ | ⑥ | $\overline{A}_4+\overline{B}_4'$ | ---- | ---- | $\overline{A}_4+\overline{B}_4'$ | | | |
| 61 | O | | 1 | | | | | | |
| 62 | ⑫ | | $\overline{A}_4$ | | | | | | |
| 63 | ⑤ | ⑦ | $\underline{A}_4+\underline{B}_4'$ | ---- | ---- | ---- | $\underline{A}_4+\underline{B}_4'$ | | |
| 64 | ⑥ | ⑤ | $\overline{A_4\oplus B_4'}$ | ---- | $\overline{A_4\oplus B_4'}$ | | | | |
| 65 | ③ | ⑥ | $\overline{C}_3+(\underline{A}_4\oplus\underline{B}_4')$ | ---- | ---- | ---- | ---- | $\overline{C}_3+(\underline{A}_4\oplus\underline{B}_4')$ | |
| 66 | O | | 1 | | | | | | |
| 67 | ⑤ | | $\underline{A}_4\oplus\underline{B}_4'$ | | | | | | |
| 68 | ④ | | $\underline{C}_3+(\overline{A_4\oplus B_4'})$ | | | | | | |
| 69 | ⑧ | ⑫ | $\underline{A}_4\oplus\underline{B}_4'\oplus\underline{C}_3$ | ---- | ---- | ---- | ---- | ---- | $\underline{A}_4$ |

*Table 7*—Continued

| T | I II | Logical Operator | ① ② ③ ④ | ⑤ | ⑥ | ⑦ | ⑧ | ⑨ ⑩ ⑪ ⑫ ⑬ ⑭ |
|---|---|---|---|---|---|---|---|---|
| | | $\underline{A}_4\oplus\underline{B}_4'\oplus\underline{C}_3$ | $\underline{X}_n$ $\underline{\overline{Y}}$ $\underline{C}_3$ $\underline{\overline{C}}_3$ | $\overline{\underline{A}_4\oplus\underline{B}_4'}$ | $\overline{\underline{A}}_4+\overline{\underline{B}}_4'$ | $\underline{A}_4+\underline{B}_4'$ | $\overline{\underline{C}}_3+(\underline{A}_4\oplus\underline{B}_4')$ | $\underline{A}_1$ $\underline{A}_2$ $\underline{A}_3$ $\underline{A}_4$ $\underline{A}_5$ $\underline{A}_6$ |
| 70 | O | 1 | | | | | | |
| 71 | ④ | $\underline{C}_3$ | | | | | | |
| 72 | ⑦ | $\overline{\underline{C}}_3+(\overline{\underline{A}_4+\underline{B}_4'})$ | | | | | | |
| 73 | ⑥ ③ | $\underline{A}_4\underline{B}_4'+\underline{C}_3(\underline{A}_4+\underline{B}_4')$ | $\underline{C}_4$ | | | | | |
| 74 | ⑬ ⑤ | $\overline{\underline{A}}_5+\overline{\underline{C}}_4=\overline{\underline{C}}_5$ | | $\overline{\underline{A}}_5+\overline{\underline{C}}_4=\overline{\underline{C}}_5$ | | | | |
| 75 | ⑭ ⑥ | $\overline{\underline{A}}_6+\underline{C}_5$ | | | $\underline{A}_6+\underline{C}_5$ | | | |
| 76 | O | 1 | | | | | | |
| 77 | ③ ⑦ | $\overline{\underline{C}}_4$ | | | | $\overline{\underline{C}}_4$ | | |
| 78 | O | 1 | | | | | | |
| 79 | ⑬ | $\overline{\underline{A}}_5$ | | | | | | |
| 80 | ⑦ | $\underline{A}_5+\underline{C}_4$ | | | | | | |
| 81 | ⑤ | $\overline{\underline{A}_5\oplus\underline{C}_4}$ | | | | | | $\underline{A}_5$ |
| 82 | 1 ⑬ | $\underline{A}_5\oplus\underline{C}_4$ | | | | | | |
| 83 | O | 1 | | | | | | |
| 84 | ⑭ ③ | $\overline{\underline{A}}_6$ | $\overline{\underline{A}}_6$ | | | | | |
| 85 | O | 1 | | | | | | |
| 86 | ⑤ | $\underline{C}_5$ | | | | | | |
| 87 | ③ | $\underline{A}_6+\overline{\underline{C}}_5$ | | | | | | $\underline{A}_6$ |
| 88 | ⑥ ⑭ | $\underline{A}_6\oplus\underline{C}_5$ | | | | | | |

In the interval by interval operation to be described below in connection with Table 7, it may be noted that if the operator is cleared to the "1" state, the complement of an applied input signal is stored in the operator. For ease of reader understanding however, each complementation of signals will not be specifically described but rather, the symbols representing complement of the signal will be used.

In the operation, directed by the interconnections listed in Table 7 above, at the first interval, $T_1$, a "0" is entered into the logical operator, to clear its contents and enter a "1." At $T_2$, the signal in cell ①, which represents the state of the Enter key during the prior cycle, is entered into the operator. At the third interval, $T_3$, the current Enter key signal $\underline{X}$ is combined into the operator to produce the signal "$\underline{\overline{Y}}$" which is placed in cell ②. At $T_4$, the logical operator is cleared, and at $T_5$ the Enter key signal $\underline{X}$ is again entered. In the next interval, $T_6$, $\overline{\underline{X}}$ is complemented, producing $\underline{X}_n$, which is stored in cell ①, representing the state of the Enter key in the current cycle. The operational steps from $T_1$–$T_6$ substantially duplicate the steps from $T_1$–$T_4$ of Table 4.

At $T_7$, the operator is cleared and the program for entry of a new number into the accumulator is commenced with the entry of the "$\underline{\overline{Y}}$" signal from cell ② into the logical operator at $T_8$. At $T_9$, the least significant of the input bits, represented by a signal on input conductor $B_1$, is applied to the logical operator and the result $(\overline{\underline{B}+\underline{\overline{Y}}})$, is stored in cell ⑤. As in the earlier described wiring table, $\underline{B_1Y}$, designated $\underline{B}'_1$ is used in the equations of Table 5. At $T_{10}$, therefore, $\underline{B}'_1$ is formed by complementing the contents of the logical operator.

The least significant digit of the number in the accumulator, $\underline{A}_1$, from cell ⑨ is combined, at $T_{11}$, with $\underline{B}'_1$. The signal now in the logical operator $(\overline{\underline{A}}_1+\overline{\underline{B}}'_1)$, which is also the complement of the carry, and therefore, is stored in cell ④ for later use. By complementing at the next interval, the carry bit, $\underline{C}_1$, is formed and stored in cell ③.

After clearing the operator at $T_{13}$, the least significant augend bit, $\underline{A}_1$, is again brought into the logical operator and, at $T_{15}$, is combined with the signal in cell ⑤, $\overline{\underline{B}'_1}$. The signal in cell ④, $(\overline{\underline{A}}_1+\overline{\underline{B}}'_1)$ is then entered into the logical operator to produce $(\overline{\underline{A}_1\oplus\underline{B}'_1})$, which, in the next interval, is complemented to produce and store in cell ⑨ a new, least significant bit, $\underline{A}_1$.

The sequence for entering the next least significant bit, $B_2$, is begun at $T_{18}$ with the clearing of the operator and at $T_{19}$, the signal $\overline{\underline{Y}}$ is entered into the logical operator. At $T_{20}$, the signal from input conductor $B_2$ is entered into the logical operator and the resulting signal, $\overline{\underline{B}}'_2$ is stored in cell ⑦. At $T_{21}$, the contents of the logical operator are complemented and combined at $T_{22}$ with the next least significant accumulator digit, $\underline{A}_2$. The result $(\overline{\underline{A}}_2+\overline{\underline{B}}'_2)$ is stored in cell ⑥ and the logical operator is cleared. The signal $\underline{A}_2$ in cell ⑩ is again entered into the logical operator at $T_{24}$ and is combined at $T_{25}$ with $\overline{\underline{B}}'_2$ in cell ⑦ to form $(\underline{A}_2+\underline{B}'_2)$ which is stored in cell ⑤. The quantity $(\overline{\underline{A}}_2+\overline{\underline{B}}'_2)$ is entered from cell ⑤ and the resultant quantity, $(\overline{\underline{A}_2\oplus\underline{B}'_2})$ is stored in cell ⑦ at $T_{26}$. The carry $\underline{C}_1$ in cell ③ is combined at $T_{27}$ with the quantity in the logical operator and the result, $\overline{\underline{C}}_1+(\underline{A}_2\oplus\underline{B}'_2)$, is stored in cell ⑧.

The operator is cleared and the contents of cell ⑦, $(\overline{\underline{A}_2\oplus\underline{B}'_2})$, are entered into the logical operator. In the following interval, the quantity $\overline{\underline{C}}_1$ is entered from cell ④ to form $C_1+(\overline{\underline{A}_2\oplus\underline{B}'_2})$ and at $T_{31}$, the quantity in cell ⑧ is also entered into the logical operator to produce and store in cell ⑩, $(\underline{A}_2\oplus\underline{B}'_2\oplus\underline{C}_1)$, representing the second least significant sum digit, $\underline{A}_2$. After clearing the logical operator, $\overline{\underline{C}}_1$ is entered from cell ④. At the next interval, the contents of cell ⑤ $(\underline{A}_2+\underline{B}'_2)$ are entered and at the next time interval, the contents of cell ⑥ are entered. At time $T_{35}$, therefore, the logical operator stores a signal representing the quantity $$[\underline{A}_2\underline{B}'_2+\underline{C}_1(\underline{A}_2+\underline{B}'_2)]$$

corresponding to the carry digit of the second addition, as in Equation 18′. The carry digit $C_2$ is stored in cell ③ as it is formed and in the following interval, is complemented and stored in cell ①.

After a total of 36 intervals, the two least significant digits of the new quantity, $\underline{A}_1$ and $\underline{A}_2$ have been produced and there are, stored in cells ③ and ④, respectively, signals representing the carry of the second digit, $\underline{C}_2$ and its complement $\overline{C}_2$.

The wiring connections from $T_{37}$ to $T_{55}$ are substantially a repetition of the connections from $T_{18}$–$T_{36}$ except that the input digit signals are $\underline{B}_3$ and $\underline{A}_3$ taken from $B_3$ and cell ⑪, respectively. The sum and carry generation is repeated starting at $T_{56}$ for digit $\underline{A}_4$ stored in cell ⑫ and input digit $\underline{B}_4$.

At $T_{73}$, $\underline{C}_4$, the carry bit resulting from the addition of $\underline{A}_4$ to $\underline{B}_4$, is formed and stored in cell ③. From $T_{74}$ through $T_{88}$, the most significant digits, $\underline{A}_5$ and $\underline{A}_6$, are formed by adding $\underline{C}_4$ to $\underline{A}_5$, forming a new carry, $\underline{C}_5$ and adding it to $\underline{A}_6$. It may therefore be seen that in the 88 intervals, four-bit digit is accumulated in a six-binary bit register, as above in the preferred embodiment using a different structure.

Figure 4:
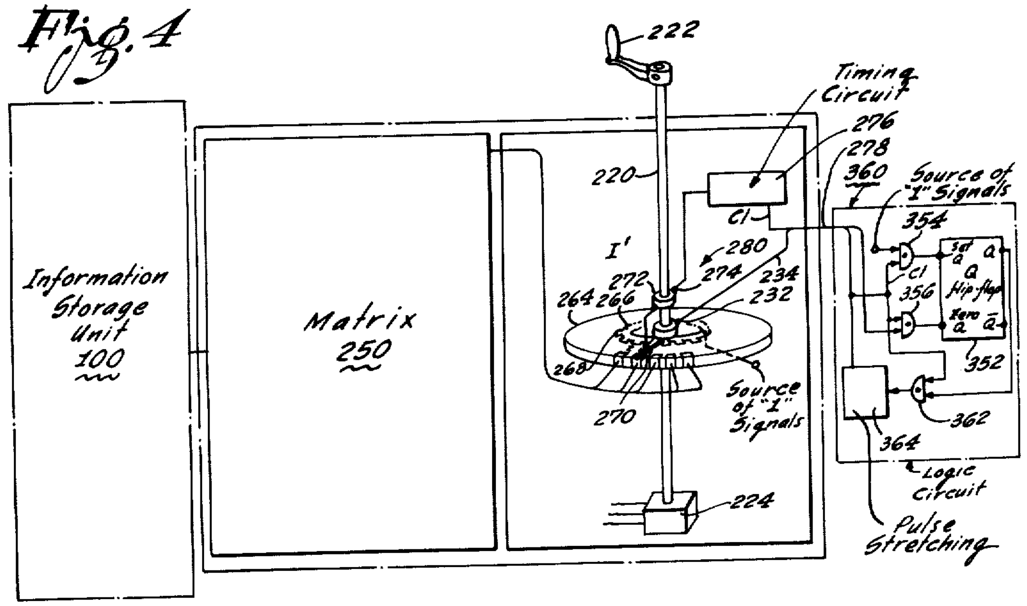
FIGURE 4 is a detailed diagram of still another embodiment of the present invention.

A still further embodiment of a computer according to the present invention is illustrated in FIGURE 4. An information storage unit 100, substantially identical to the one described in connection with FIGURE 1 above, is also suitable for use with the embodiment of FIGURE 4 and has been indicated by a rectangle. The wiring matrix 250 has also been shown as a rectangle and is substantially identical to the matrix of FIGURES 1 and 3. A single deck rotary switch 280 distributes signals in the present embodiment and is substantially similar in structure to rotary switches 210 and 262 of FIGURES 1 and 3. Deck I′ 264 of the computer of FIGURE 3 above can easily be used as the deck of switch 280 and the corresponding reference numerals are used in FIGURE 4.

A modified alternative logic circuit 360, substantially similar to the alternative logic circuit 350 of FIGURE 3 is used in the present further embodiment, based on the alternative logic circuit 350. A third two input "and" gate 362, one input of which is connected to the Q output terminal of the Q flip-flop 352 has been added to the alternative logic circuit 350 to modify it for use here. The second input to the third "and" gate 362 is connected to the conductor upon which the timing impulses C1 are provided. The output of the third gate 362 is applied to a pulse shtretching circuit 364. The pulse stretching circuit 364 output is connected through a conductor to the input signal conductor of the cable 278, which is connected to the common terminal 232 of deck I′ 264.

The pulse stretching network 364 may be any of the well known circuits which produce a relatively wide output pulse in response to a relatively brief input pulse. Such a circuit might be achieved by combining a one-shot multi-vibrator with a Schmitt trigger circuit. Application of an input signal pulse to such a combination places the one shot circuit in its astable state which fires the Schmitt trigger and maintains the Schmitt trigger conductive. As the one shot returns to its stable state, the Schmitt trigger is triggered off.

In the operation of the computer of FIGURE 4, an input signal is applied from the contacted segment of deck I′ to the Q flip-flop 352 when the timing pulse C1 is generated. At the same time, the output of the flip-flop Q, representing the result of the logical operation in the prior operating interval, is applied to the pulse stretching circuit 364. The output signal of the pulse stretching circuit is applied to the same segment of deck I′ which is still in contact with the wiper and which, in turn, applies the output signal to the corresponding column conductor 252 of the matrix. The signal is then transmitted to the interconnected row conductor 254 and back to the information storage unit 100.

For example, in an operating interval, a signal applied from cell ① is combined with the signal in the Q flip-flop 352 to form a new signal in the flip-flop by the end of the interval. At the same time that the input signal is applied, the signal representing the result of the prior interval is applied to cell ① for storage therein.

A detailed wiring table has not been prepared from the computer of FIGURE 4, such a table not being deemed necessary for an understanding of the invention. However, such a table can easily be prepared in accordance with the principles set forth in connection with the foregoing description, and form an extension of the procedures followed in preparing the other tables.

Thus, there has been shown an improved general purpose computer of remarkable simplicity and economy in which rugged components can be used to assure longevity and reliability of operation.

The power and versatility of such a computer is virtually unbounded. It will be readily apparent to even those relatively unskilled in the art, that a distributer computer can be made to behave like virtually any digital computer in its response to applied information signals. If the set of Boolean equations that describe a particular computer is ascertained, one can prepare a wiring table, using the procedures set forth above, that will generate that set of computer-defining equations. Input signals, applied to either the suitably wired distributer computer or the particular computer whose equations determine the wiring table, would be processed to produce the same output results in both. Moreover, if the set of Boolean equations were properly chosen, many modifications of program, operation, and memory, which would require extensive physical changes to the original machine, could be accomplished in the distributer computer by entry of suitable input signals.

Inasmuch as every digital computer can be uniquely described by a set of Boolean equations, a distributer computer can generate the complex functions of Boolean variables comprising the Boolean equations of any other computer and then solve these Boolean equations for applied input variables.

What is claimed as new is:

1. A general purpose digital computer for performing a plurality of logical operations upon applied input signals to produce a complex logical function of applied signals, the computer comprising the combination of: storage means including an array of discrete, individual memory cells for storing bivalued signals representing information; logical operating means operable to produce an output signal representing a primitive logical function of two variables; signal applying means connected to said logical operating means for applying signals representing said two variables thereto and including switching means operable in successive intervals in a preselected cyclical sequence for contacting during each interval one of said memory cells and applying the signal stored therein to said logical operating means as one of said variables whereby a signal stored in said memory cell is combined in a primitive logical operation to produce a result signal in a first operating interval and, in subsequent intervals, the result signals of several primitive logical operations are combined to produce further result signals which, after a predetermined number of operating intervals, represent a desired complex logical function of applied input signals.

2. The computer of claim 1 wherein said signal applying means further includes second switching means operable in successive intervals in a preselected cyclical sequence for contacting during each interval one of said memory cells and applying the signal stored therein to said logical operating means as the other of said two variables.

3. The computer of claim 1 wherein said logical operating means includes a flip-flop circuit for producing in each operating interval a signal representing a primitive logical function of an applied input signal and the signal represented by the state of the flip-flop.

4. A general purpose digital computer for performing a plurality of logical operators upon applied input signals to produce a complex logical function of applied signals, the computer comprising the combination of: logical operating means operable in response to applied input signals to produce output signals representing a primitive logical function of applied input signals; storage means including an array of discrete, individual memory cells for storing bivalued signals representing information; switching means connected to said logical operating means and said storage means, said switching means being operable in successive intervals to apply input signals from predetermined ones of said memory cells to said logical operating means and to apply output signals from said logical operating means to predetermined memory cells of said storage means for storage therein, all in a preselected cyclical sequence, whereby signals stored in said memory cells are combined in a primitive logical operation to produce a result signal in a first operating interval and, in subsequent intervals, the result signals of several primitive logical operations are combined to produce further result signals which, after a predetermined number of operating intervals, represent a desired complex logical function of applied input signals.

5. Apparatus according to claim 4 wherein each of said memory cells is a capacitor.

6. Apparatus of claim 4 whereby said switching means include a cyclically operable rotary switch having a plurality of individual first terminals, each connected to a different memory cell, and a second, common terminal which is successively connected to each of said first terminals, said second terminal being connected to said logical operating means.

7. Apparatus of claim 4 wherein said storage means includes input memory cells for entering new signals representing information into the computer.

8. In a computing apparatus for performing a predetermined logical operation upon applied bivalued signals representing information, the combination comprising: a group of memory cells, each cell for storing only a single bivalued signal; a plurality of read terminals, each connected to only a single one of said cells for retrieving signals therefrom, selected ones of said cells being each simultaneously connected to more than one of said read terminals; a plurality of write terminals, each connected to a single one of said cells for entering signals therein, selected ones of said cells being connected to more than one write terminal; logical gating means operable in response to applied signals for producing output signals representing the result of the predetermined logical operation upon the information represented by the applied signals; and switching means serially connecting said read terminals to said logical gating means for applying signals from said cells in a first predetermined sequence, and serially connecting said logical gating means to said write terminals for applying output signals therefrom to said cells in a second predetermined sequence, whereby output signals stored from a logical operation are reapplied in subsequent logical operations.

9. In a computing apparatus for generating complex functions of Boolean variables by combining in successive operating intervals applied input signals representing simpler functions of Boolean variables to form output signals representing more complex functions of the applied input signals, the combination comprising: an array of discrete memory cells, each cell for storing only a single bivalued signal representing information; logical operating means operable in each operating interval in response to applied input signals for producing an output signal representing a predetermined Boolean function of applied signals; first switching means including a plurality of read terminals, each connected to only a single one of said cells for retrieving signals therefrom, selected ones of said cells being simultaneously connected to more than one of said read terminals, and further including means connecting said read terminals to said logical operating means in a preselected desired sequence for providing an input signal from said cells in each operating interval; and second switching means including a plurality of write terminals each connected to a single one of said cells for entering signals thereto, selected ones of said cells being connected to more than one of said write terminals, and further including means connecting said logical operating means to said write terminals in a preselected desired sequence for applying an output signal representing a predetermined Boolean function of applied input signals to be stored in one of said cells in each operating interval, whereby in successive operating intervals, functions of Boolean variables, produced and stored in earlier intervals, are combined in subsequent intervals to form more complex functions of Boolean variables.

10. Cyclically operable computing apparatus comprising the combination of: first cyclical switching means having a plurality of first input terminals, a first output terminal, and first contacting means for sequentially connecting each first input terminal to said first output terminal during a cycle of operation of said computing apparatus; second cyclical switching means operable in synchronism with said first switching means, said second switching means including a second input terminal, a plurality of second output terminals, and second contacting means for sequentially connecting said second input terminal to each second output terminal during a cycle of operation of said computing apparatus, logical operating means having an input terminal connected to said first switching means output terminal and an output terminal connected to said second switching means input terminal, said logical operating means being operable in response to signals applied at said input terminal to produce an output signal at said output terminal representing a predetermined logical function of the applied signal; information storage means including an array of discrete memory cells each cell adapted to store only a single information representing signal, and including means for providing additional input signals; and connecting means for connecting said cells in a predetermined arrangement to said first switching means input terminals for providing input signals thereto and for connecting said cells in a predetermined arrangement to said second switching means output terminals for storing output signals therefrom said connecting means including apparatus for simultaneously connecting each of predetermined ones of said cells both to a corresponding second output terminal of said second switching means and to a corresponding predetermined first input terminal of said first switching means, said predetermined first input terminal being connected by said first contacting means to said first output terminal later in said cycle of operation of said computing means than the connection of said predetermined second output terminal to said second input terminal, said connecting means further including apparatus for connecting each of said first input terminals of said first switching means to only a single cell of said array of cells, selected ones of said cells being each simultaneously connected to more than one of said first input terminals, whereby output signals produced and stored during relatively early portions of an operating cycle produce further output signals which, in turn, are applied as input signals in still later portions of the operating cycle, all in a predetermined, ordered fashion.

11. Apparatus for performing digital computation in a cyclical sequence of successive intervals, the combination comprising: an array of individual storage cells each cell adapted to store only a single bivalued information signal; a logic circuit operable in response to applied information signals to produce an output signal representing a chosen logical function of the applied signals; a first connecting means including a plurality of reading terminals and further including means simultaneously conductively connecting said cells to said plurality of reading terminals in a predetermined arrangement, each of said reading terminals being conductively connected to only a single one of said cells, selected ones of said cells being each simultaneously conductively connected to more than one of said reading terminals; second connecting means including a plurality of writing terminals, and further including means simultaneously conductively connecting said cells to said plurality of writing terminals in a predetermined arrangement; and means for serially connecting said reading terminals to said logical circuit, and for connecting said logic circuit to said second means to apply output signals serially to said writing points, said logic circuit being operable in an interval to produce and store in a predetermined storage cell an output signal representing a chosen logical function of the signals applied from predetermined cells.

12. In a computing apparatus for performing a predetermined logical operation on applied information signals, the combination comprising: a first plurality of discrete memory cells, each cell for storing only a single bivalued signal; logical gating means operable in response to at least two applied information representing signals in an operating interval for producing an output signal representing the result of a predetermined logical operation upon the information represented by the applied signals; first means including a second plurality of read terminals each connected to only a single one of said cells for retrieving signals from said cell, selected ones of said cells being simultaneously connected to more than one of said read terminals, and means for connecting said read terminals to said logical gating means in a predetermined sequential order for applying a signal from said cells in each operating interval; second means for applying a second information signal to said logical gating means in each operating interval; and third means including a third plurality of write terminals each connected to a single one of said cells for entering signals into said cell, selected ones of said cells being simultaneously connected to more than one write terminal, and means connecting said logical gating means to said write terminals in a predetermined sequential order for applying and storing an output signal in one of said cells in each operating interval.

13. In a computing apparatus for performing a predetermined logical operation on applied information signals, the combination comprising: an array of discrete memory cells, each for storing only a single bivalued signal; first switching means including a plurality of read-write terminals each read terminal being connected to a single one of said cells for retrieving signals to be applied as input signals from and for entering output signals into the cell to which it is connected, selected ones of said cells being connected to more than one read-write terminal; logical operating means connected to said first switching means and operable in response to information representing input signals applied therefrom in an operating interval for producing an output signal representing the result of a predetermined logical operation upon the information represented by the applied input signals, said switching means being operable to connect said read-write terminals to said logical operating means in a predetermined sequential order for applying input signals from said cells each operating interval, and being further operable for applying and storing an output signal in one of said cells in each operating interval in a predetermined sequential order; and gating means connecting said logical operating means to said first switching means for alternatively transmitting input and output signals therebetween.

14. In a computing apparatus for performing a predetermined logical operation on applied information signals, the combination comprising: an array of discrete memory cells, each cell for storing only a single bivalued signal; first switching means including a plurality of read terminals each connected to only a single one of said cells for retrieving signals from said cell to be applied as input signals, selected ones of said cells being each connected to more than one of said read terminals; second switching means including a second plurality of read-write terminals each connected to only a single one of said cells for retrieving signals to be applied as input signals from and for entering output signals into said cell, selected ones of said cells being each connected to more than one of said read-write terminals; logical operating means connected to said first and second switching means and operable in response to information representing input signals applied therefrom in an operating interval for producing an output signal representing the result of a predetermined logical operation upon the information represented by the applied input signals; said switching means being operable to connect said read terminals and said read-write terminals to said logical operating means in a predetermined sequential order for applying input signals from said cells each operating interval, said switching means being further operable for applying and storing an output signal in one of said cells in each operating interval in a predetermined sequential order; and gating means connecting said logical operating means to said second switching means for alternatively transmitting input and output signals therebetween.

15. In a computing apparatus for performing a predetermined logical operation upon two applied bivalued input signals representing information to produce an output signal which is subsequently available as an input signal, the combination comprising: a group of memory cells, each for storing only a single bivalued signal; a plurality of read terminals, each connected only to a single one of said cells for retrieving signals therefrom, selected ones of said cells being each simultaneously connected to more than one of said read terminals; a plurality of write terminals, each connected to a single one of said cells for entering signals, selected ones of said cells being each simultaneously connected to more than one of said write terminals; logical operating means operable in a first interval in response to applied first and second signals for producing output signals representing the result of the predetermined logical operation upon the information represented by the applied first and second signals; first switching means serially conductively connecting said read terminals to said logical operating means in successive intervals for applying first signals thereto from said cells in a first predetermined sequence; second switching means serially conductively connecting said read terminals to said logical operating means in successive intervals for applying second signals thereto from said cells in a second predetermined sequence; and third switching means serially conductively connecting said logical operating means in successive intervals to said write terminals for applying output signals to be stored in said cells in a third predetermined sequence, whereby output signals stored from a logical operation are reapplied in subsequent logical operations as input signals.

16. A computing apparatus according to claim 15 wherein said memory cells include a plurality of individual capacitors, sources of bivalued signals, and input signal sources, and wherein said first, second, and third switching means operate in timed synchronism.

References Cited in the file of this patent

UNITED STATES PATENTS

| | | |
|---|---|---|
| 1,845,534 | Waite | Feb. 16, 1932 |
| 2,881,979 | Blundi | Apr. 14, 1959 |
| 2,905,521 | Hollabaugh | Sept. 22, 1959 |
| 2,981,936 | Buhrendorf | Apr. 25, 1961 |

UNITED STATES PATENT OFFICE

CERTIFICATE OF CORRECTION

Patent No. 3,113,205 December 3, 1963

Joseph O. Campeau

It is hereby certified that error appears in the above numbered patent requiring correction and that the said Letters Patent should read as corrected below.

Column 6, line 44, after "apply" insert -- signals --; column 21, line 46, strike out "which"; column 23, line 21, after "intervals," insert -- a --; line 48, for "sthretching" read -- stretching --; column 25, line 5, for "operators" read -- operations --; column 26, line 32, for "computing" read -- computer --; column 27, line 14, for "points" read -- terminals --.

Signed and sealed this 19th day of May 1964.

(SEAL)
Attest:
ERNEST W. SWIDER

Attesting Officer

EDWARD J. BRENNER
Commissioner of Patents